(12) United States Patent
Ranjeva et al.

(10) Patent No.: US 10,547,342 B2
(45) Date of Patent: *Jan. 28, 2020

(54) CAMERA AND FLASH LENS FOR PROTECTIVE CASE

(71) Applicant: OTTER PRODUCTS, LLC, Fort Collins, CO (US)

(72) Inventors: Minna L. Ranjeva, San Diego, CA (US); Corinne E. Allen, San Diego, CA (US); Aaron M. Lipner, San Diego, CA (US); Gareth F. Watt, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,921

(22) Filed: May 31, 2019

(65) Prior Publication Data

US 2019/0288726 A1   Sep. 19, 2019

Related U.S. Application Data

(63) Continuation of application No. 15/910,942, filed on Mar. 2, 2018, now Pat. No. 10,355,735.

(60) Provisional application No. 62/556,921, filed on Sep. 11, 2017.

(51) Int. Cl.
| | |
|---|---|
| *H04B 1/3888* | (2015.01) |
| *G03B 11/04* | (2006.01) |
| *G03B 15/03* | (2006.01) |
| *G03B 17/56* | (2006.01) |
| *A45C 11/00* | (2006.01) |

(52) U.S. Cl.
CPC ......... *H04B 1/3888* (2013.01); *G03B 11/043* (2013.01); *G03B 11/045* (2013.01); *G03B 15/03* (2013.01); *G03B 17/56* (2013.01); *A45C 2011/002* (2013.01)

(58) Field of Classification Search
CPC ............... H04B 1/3888; G03B 11/043; A45C 2011/002
USPC ..................................... 455/575.8
See application file for complete search history.

(56) References Cited

U.S. PATENT DOCUMENTS

| | | |
|---|---|---|
| 6,995,976 B2 | 2/2006 | Richardson |
| 7,158,376 B2 | 1/2007 | Richardson et al. |
| 7,889,489 B2 | 2/2011 | Richardson et al. |
| 7,949,242 B2 | 5/2011 | Yang et al. |
| 8,155,514 B1 | 4/2012 | Chow et al. |
| 8,342,325 B2 | 1/2013 | Rayner |
| 8,393,466 B2 | 3/2013 | Rayner |
| 8,648,957 B2 | 2/2014 | Ryu |
| 8,917,496 B2 | 12/2014 | Richardson et al. |
| 9,001,176 B2 | 4/2015 | Springer |
| 9,548,785 B2 | 1/2017 | Rayner |

(Continued)

FOREIGN PATENT DOCUMENTS

WO    2013090843 A1    6/2013

*Primary Examiner* — Eugene Yun

(57) ABSTRACT

A protective lens cover for a camera and a flash of an electronic device includes a first lens portion for covering the camera of the electronic device and a second lens portion for covering the flash of the electronic device. The first lens portion has a top surface, a bottom surface positioned directly opposite the top surface, and a side surface continuously extending from the top surface to the bottom surface. At least a portion of the side surface of the first lens portion is coated with a light-blocking ink.

20 Claims, 13 Drawing Sheets

(56) References Cited

U.S. PATENT DOCUMENTS

| | | |
|---|---|---|
| 9,729,770 B2 | 8/2017 | Barros et al. |
| 10,355,735 B2 | 7/2019 | Ranjeva et al. |
| 10,362,847 B1 | 7/2019 | Okada et al. |
| 2003/0209661 A1 | 11/2003 | Chen et al. |
| 2005/0030707 A1 | 2/2005 | Richardson et al. |
| 2006/0126173 A1 | 6/2006 | Yakushiji et al. |
| 2006/0147191 A1 | 7/2006 | Kim |
| 2011/0294543 A1 | 12/2011 | Lapstun et al. |
| 2012/0314354 A1 | 12/2012 | Rayner |
| 2014/0119718 A1 | 5/2014 | Oh et al. |
| 2016/0178805 A1 | 6/2016 | Kang et al. |
| 2019/0081652 A1 | 3/2019 | Ranjeva et al. |

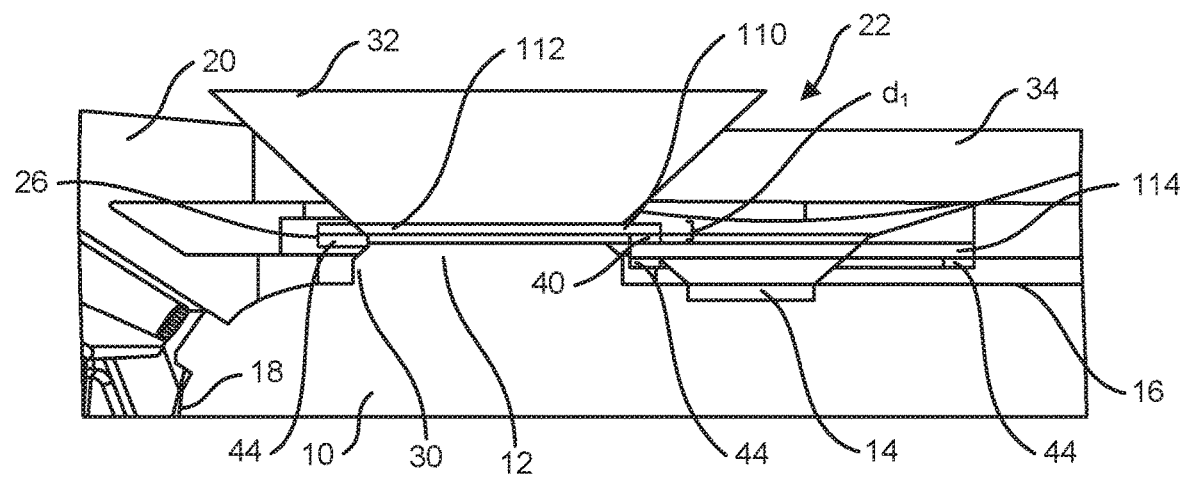
FIG. 3A
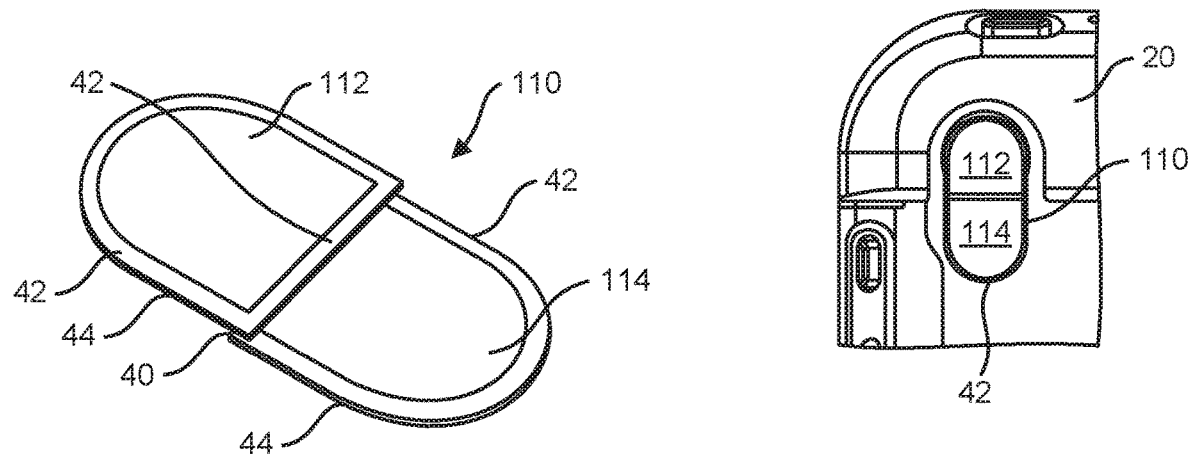
FIG. 3B
FIG. 3C

CAMERA AND FLASH LENS FOR PROTECTIVE CASE

CROSS REFERENCE TO RELATED APPLICATIONS

This application is a continuation of U.S. application Ser. No. 15/910,942 filed Mar. 2, 2018, which claims priority to U.S. Provisional Application No. 62/556,921 filed Sep. 11, 2017, the disclosures of which are hereby incorporated by reference in their entirety.

BACKGROUND

Personal electronic devices are commonly used for communication, entertainment purposes, as well as Internet access and a variety of other purposes. Examples of personal electronic devices include smartphones, tablet computers, gaming devices, audio players, video players, cameras, portable computers, two-way radios, GPS receivers, smart glasses, virtual reality glasses or helmets, masks or eyewear including an electronic display, and/or other portable devices. Protective cases for electronic devices provide protection for the electronic device from various forms of damage, including damage from dust, water, snow, dirt, and drops. Exemplary protective cases are disclosed in U.S. Pat. Nos. 8,342,325 and 9,300,344, the disclosures of which are hereby incorporated by reference in their entirety.

Many electronic devices include a camera and associated flash, such as a flash LED, for providing light when taking a picture with the camera. The camera and flash are often positioned in close proximity, such as on the rear of the electronic device. It can be desirable to include a lens covering with the protective case to protect the camera and/or flash from damage, such as scratches or water.

In some electronic devices, the camera is configured to adjust exposure time and/or other settings based on the status of the flash. However, the presence of a protective lens over one or both of the camera and flash reduces the amount of light transmitted from the flash to subject, as well as the light from the subject to the camera aperture. Additionally, the surface of the protective lens may reflect or otherwise transmit a portion of the light from the activated flash directly to the camera without passing through the protective lens.

Improvements in the foregoing are desired.

SUMMARY

In one example, a lens for a protective case for an electronic device having a camera and flash is provided. The lens includes a first optically transparent portion configured to be positioned proximate the camera and a second optically transparent portion configured to be positioned proximate the flash. The first optically transparent portion has a first surface that is a first distance from a back surface of the electronic device. The second optically transparent portion has a second surface that is a second distance from a back surface of the electronic device, wherein the second distance is less than the first distance.

In one example, a protective case for an electronic device having a camera and a flash is provided. The protective case includes a lens comprising a first lens portion and a second lens portion. The first lens portion includes a first optically transparent region configured to be positioned proximate the camera when the electronic device is installed in the protective case. The first lens has a top surface, a bottom surface opposite the top surface, and a side surface. The side surface is at least partially coated with a light-blocking ink. The second lens portion includes a second optically transparent region configured to be positioned proximate the flash of the installed electronic device.

In one example, a lens insert configured protect a camera and a flash of an electronic device received within a protective case is provided. The lens insert includes a first lens portion including a first optically transparent region configured to be positioned proximate the camera when the electronic device is installed in the protective case. The first lens has a top surface, a bottom surface opposite the top surface, and a side surface. The side surface is at least partially coated with a light-blocking ink. The lens insert also includes a second lens portion including a second optically transparent region configured to be positioned proximate the flash of the installed electronic device. The lens insert also includes a housing retaining the first lens portion and the second lens portion the housing including a perimeter lip surrounding the first lens portion and the second lens portion.

In one example, a protective lens cover configured protect a camera and a flash of an electronic device received within a protective case is provided. The protective lens cover includes a first lens portion and a second lens portion. The first lens portion includes a first optically transparent region configured to cover and protect the camera of the received electronic device. The first lens portion has a top surface, a bottom surface opposite the top surface, and a side surface. The side surface at least partially coated with a light-blocking ink. The second lens portion includes a second optically transparent region configured to cover and protect the flash of the received electronic device. The second lens portion including a compressible gasket configured to be in contact with a back surface of the installed electronic device. The gasket is formed from a light-blocking material configured to prevent substantially all light from the flash of the installed electronic device from being transmitted through the gasket.

In one example, a protective lens cover for a camera and a flash of an electronic device is provided. The protective lens cover includes a first lens portion for covering the camera of the electronic device and a second lens portion for covering the flash of the electronic device. The first lens portion has a top surface, a bottom surface positioned directly opposite the top surface, and a side surface continuously extending from the top surface to the bottom surface. At least a portion of the side surface of the first lens portion is coated with a light-blocking ink. The second lens portion has a top surface. The top surface of the first lens portion is offset from the top surface of the second lens portion by a first step distance In one example, a lens insert for covering a camera and a flash of an electronic device is provided. The lens insert includes a first lens, a second lens, and a housing receiving the first lens and the second lens. The first lens has a first top surface, a first bottom surface positioned directly opposite the first top surface, and a first side surface extending from the first top surface to the first bottom surface and at least partially coated with a light-blocking ink. The first bottom surface is configured to be positioned facing the camera and the first top surface is configured to be positioned facing away from the camera when the lens insert covers the electronic device. The second lens has a second top surface, a second bottom surface positioned directly opposite the second top surface, and a second side surface extending from the second top surface to the second bottom surface.

In one example, a protective case for an electronic device having a camera and a flash is provided. The protective case includes a surface configured to at least partially cover the electronic device when the electronic device is installed within an interior of the protective case. The protective case further includes a lens insert received within a recess of the surface. The lens insert includes a housing a first lens received within the housing and configured to cover the camera of the installed electronic device, and a second lens received within the housing and configured to cover the flash of the installed electronic device. The first lens has a first bottom surface facing the interior of the protective case, a first top surface positioned directly opposite the first bottom surface, and a first perimeter surface extending from the first top surface to the first bottom surface. The first perimeter surface is at least partially coated with a light-blocking ink.

BRIEF DESCRIPTION OF THE DRAWINGS

FIG. 3A illustrates a cross-section of a portion of a first embodiment of an exemplary protective case and lens proximate the camera and flash of the electronic device;

FIG. 3B illustrates the protective lens of FIG. 3A;

FIG. 3C illustrates another view of the protective case and lens of FIG. 3A;

DETAILED DESCRIPTION

Figure 1:
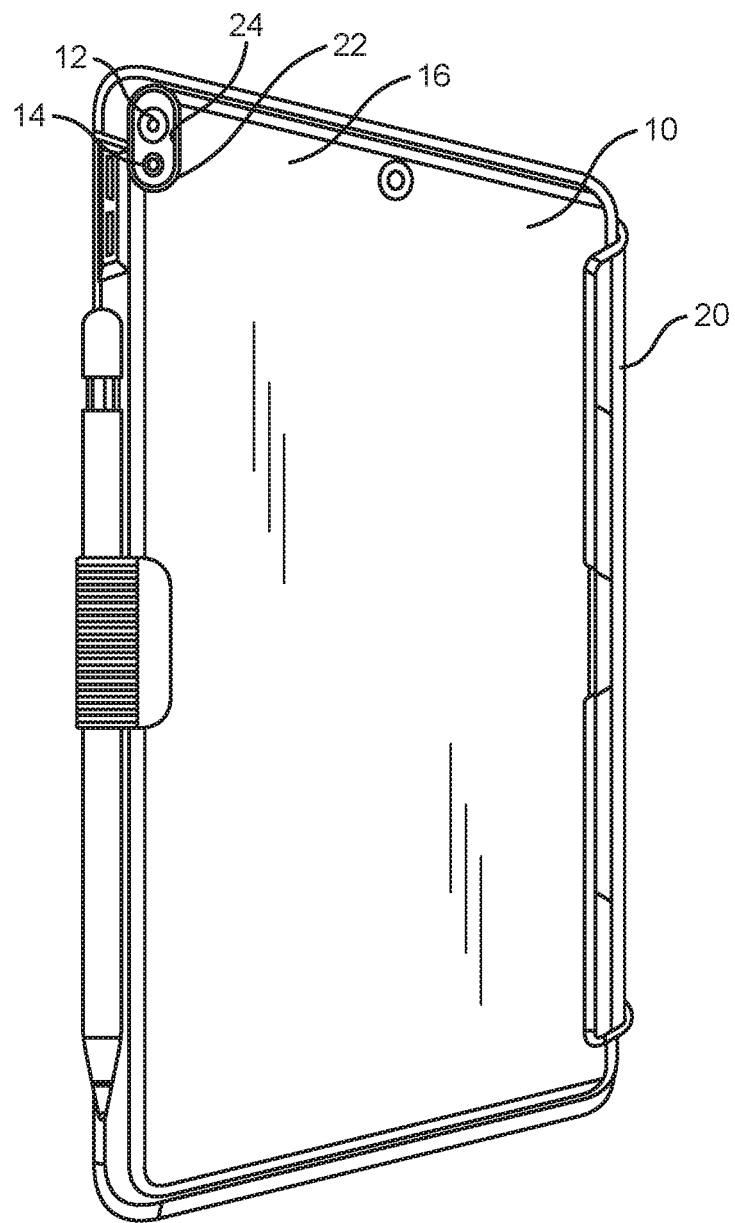
FIG. 1 illustrates an exemplary electronic device enclosed in an exemplary protective case.

An exemplary electronic device 10 and protective case 20 are illustrated in FIG. 1. Although FIG. 1 illustrates electronic device 10 as a tablet computer, in other embodiments the electronic device 10 may be selected from, without limitation, smartphones, gaming devices, audio players, video players, cameras, portable computers, two-way radios, GPS receivers, smart glasses, virtual reality glasses or helmets, masks or eyewear including an electronic display, and/or other portable electronic devices.

Electronic device 10 may include one or more display screens, microphones, speakers, and/or user input buttons (not illustrated in FIG. 10). Electronic device 10 includes at least one camera 12 and associated flash 14. Although the camera 12 and flash 14 are illustrated on a back surface 16 of device 10, in other embodiments, the camera 12 and flash 14 may be positioned elsewhere on device 10, such as a front surface 17 (not illustrated in FIG. 10).

Protective case 20 encases at least a portion of electronic device 10 to prevent device 10 from damage. Protective case 20 may comprise a single-piece into which electronic device 10 is fitted, or protective case 20 may include two or more pieces removably attached to each other through one or more clasping or coupling mechanisms. Exemplary protective cases 20 are disclosed in U.S. Pat. Nos. 8,342,325 and 9,300,344, the disclosures of which are hereby incorporated by reference in their entirety.

Protective case 20 includes at least one recess or aperture 22 providing optical access to camera 12 and flash 14 of electronic device 10 when electronic device 10 is inserted or enclosed in protective case 20. Aperture 22 is at least partially covered by one or more lenses 24 for protecting camera 12 and/or flash 14. Exemplary lenses 24 include the lenses 110, 210, 310, 410, 510, 610 illustrated in FIGS. 3A, 4A, 5A, 6A, 7A, and 8A. As used herein, a lens may comprise a single piece of transparent material covering both camera 12 and flash 14, or a lens may comprise two or more pieces of transparent material, each covering at least a portion of camera 12 and/or flash 14.

Lens 24 includes an optically transparent region allowing light to be transmitted through lens 24. The optically transparent region allows for light emitted by flash 14 to pass through lens 24 and illuminate a target area, and also allow light from the target area to pass through lens 24 to camera 12.

In some embodiments, the lens 24 has an optical transmissivity of at least about 90%, at least about 95%, at least about 97%, at least about 98%, or greater. In some embodiments, lens 24 includes one or more coatings, such as anti-reflective coatings, to reduce the amount of light lost due to reflection. In some embodiments, the optically transparent region of lens 24 is formed from sapphire or glass, such as a fortified and/or tempered glass such as Alpha Glass available from Otter Products, LLC, Gorilla Glass available from Corning Inc., Dragontail glass available from Asahi Glass Co., or Xensation available from Schott AG. In some embodiments, the optically transparent region of lens 24 is formed from a transparent plastic, such as nylon or polyethylene terephthalate (PET). In some exemplary embodiments, the optically transparent region of lens 24 has a thickness as little as 0.1 mm, 0.2 mm, 0.3 mm, as great as 0.33 mm, 0.4 mm, 0.5 mm, or within any range defined between any two of the foregoing values, such as 0.1 mm to 0.5 mm, or 0.2 mm to 0.4 mm.

Figure 2:
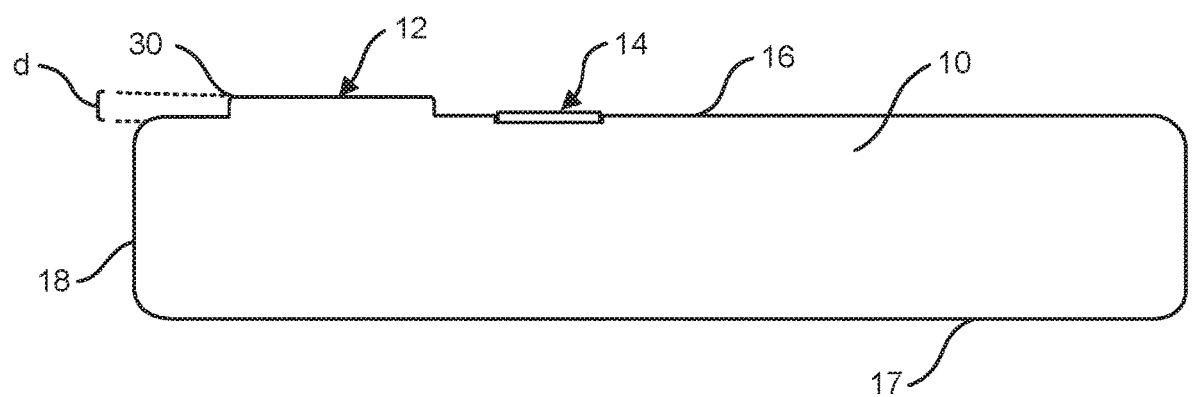
FIG. 2 illustrates a portion of the electronic device including a camera and a flash.

Referring next to FIG. 2, a portion of an electronic device 10 is illustrated including camera 12 and flash 14. As illustrated in FIG. 2, camera 12 and flash 14 are positioned on a back surface 16 of electronic device 10 near a side surface 18. In other embodiments, camera 12 and/or flash 14 may be positioned on a front surface 17 or side surface 18 of electronic device, or may be positioned remotely from side surface 18. In some embodiments, camera 12 and flash 14 are positioned on back surface 18 proximate a rear corner of electronic device 10. In some embodiments, camera 12 and flash 14 are positioned in an upper central portion of back surface 18 of electronic device 10.

As shown in FIG. 2, at least one of camera 12 and flash 14 terminates at a position that is not substantially level with surface 16. In the illustrated embodiment, camera 12 includes a housing 30 extending a distance "d" above back surface 16 of electronic device. Flash 14 terminates at a position substantially flush with back surface 16. In other exemplary embodiments, camera 12, flash 14, or both may independently extend above or below surface 16.

Referring next to FIGS. 3A-3C, a first embodiment of lens 24 is illustrated as stepped lens 110. FIG. 3A illustrates a cross-section of a portion an exemplary protective case 20 including lens 110 covering the camera 12 and flash 14 of installed electronic device 10. As illustrated in FIG. 3A, the housing 30 of camera 12 extends above the back surface 16 of electronic device 10. FIG. 3B illustrates a perspective view of lens 110. FIG. 3C illustrates a corner portion of protective case 20 including lens 110.

Stepped lens 110 comprises a first portion 112 having an optically transparent region covering camera 12 and a second portion 114 having an optically transparent region covering flash 14. In some embodiments, stepped lens 110 is at least partially received within a recess 26 of case 20 to secure stepped lens 110 to case 20.

In some exemplary embodiments, the first portion 112 defines a first plane and the second portion 114 defines a second plane where the first and second planes are not co-planar. Illustratively, first portion 112 including a first optically transparent region proximate installed camera 12 and second portion 114 including a second optically transparent region proximate installed flash 14 are joined by an offset or step such that a distance $d_1$ is present between the top surfaces of each portion. In other embodiments, the top surfaces of the first portion 112 and the second portion 114 are co-planar and no step is present between the top surfaces of each portion.

As illustrated in FIGS. 3B and 3C, first portion 112 and second portion 114 are each substantially D-shaped. First portion 112 and second portion 114 are illustratively attached by a suitable adhesive 40. In some exemplary embodiments, adhesive 40 is optically opaque to prevent light from bleeding from flash 14 directly to camera 12 without passing through lens 110.

Stepped lens 110 includes a light-blocking ink 42 extending around an outer portion of first portion 112 and second portion 114. Ink 42 is illustratively edge painted or pad printed to stepped lens 110 to optically isolate edges of the stepped lens 110. As illustrated in FIG. 3B, the ink 42 is printed around an outer perimeter of each of first portion 112 and second portion 114. A gasket 44 is illustratively provided between the case 20 and the lower surfaces of first portion 112 and second portion 114 to prevent light from bleeding from flash 14 directly to camera 12 without passing through lens 110. In some embodiments, gasket 44 may include an adhesive to secure stepped lens 110 to case 20.

As illustrated in FIG. 3A, the stepped lens 110 allows the first portion 112 to be positioned relatively close to the end of the housing 30 of camera 12 and the second portion 114 to be positioned relatively close to the flash 14. In some embodiments, the close positioning allows for higher transmissivity and reduced reflections through stepped lens 110.

FIG. 3A further illustrates the field of view 32 for camera 12 and field of view 34 for flash 14. The area encompassed by fields of view 32, 34 may also be referred to as keep out zones or keep out cones. It can be desirable to keep the fields of view 32, 34 as clear from obstruction as possible. As shown in the exemplary embodiment of FIG. 3A, the use of the stepped lens 110 allows for no intrusion of the case 20 into the field of view 32 for camera 12. The intrusion into the field of view 34 for the flash 14 is limited to a small amount of the first portion 112 associated with the step between the first portion 112 and second portion 112. This allows for a relatively high level of the light from flash 14 to be transmitted through stepped lens 110 and received by camera 12.

Figure 4A:
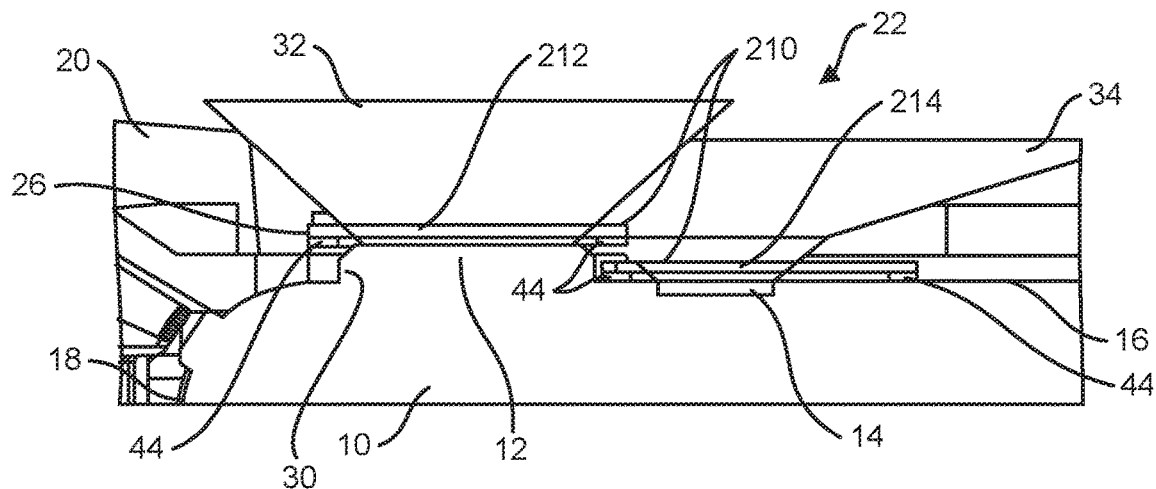
FIG. 4A illustrates a cross-section of a portion of a second embodiment of an exemplary protective case and lens proximate the camera and flash of the electronic device.
Figure 4B:
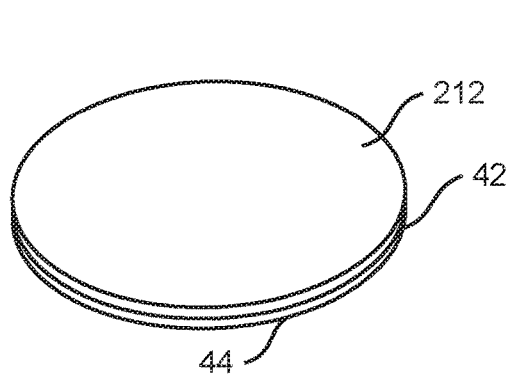
FIG. 4B illustrates the protective lens of FIG. 4A.
Figure 4C:
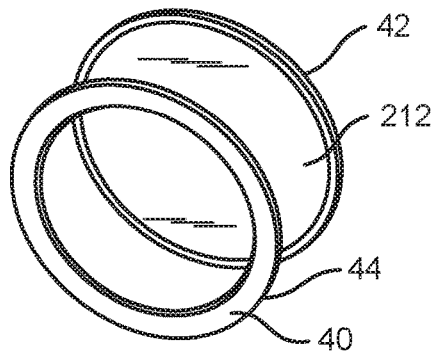
FIG. 4C illustrates an exploded view of the protective lens of FIG. 4B.
Figure 4D:
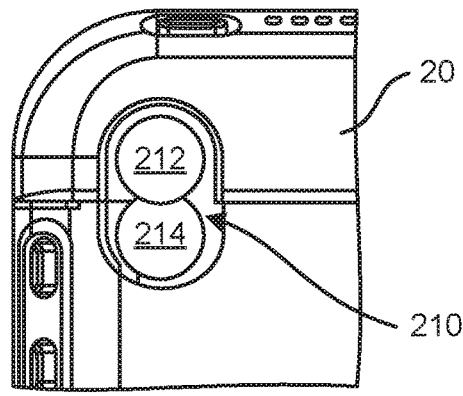
FIG. 4D illustrates another view of the protective case and lens of FIG. 4A.

Referring next to FIGS. 4A-4D, a second embodiment of lens 24 is illustrated as dual lens 210. Dual lens 210 includes several similar elements as stepped lens 110 of FIGS. 3A-3C, and similar part numbers are used to describe similar elements. FIG. 4A illustrates a cross-section of a portion an exemplary protective case 20 including lens 210 covering the camera 12 and flash 14 of installed electronic device 10. As illustrated in FIG. 4A, the housing 30 of camera 12 extends above the back surface 16 of electronic device 10. FIG. 4B illustrates a perspective view of lens 210. FIG. 4C illustrates an exploded view of a portion of the lens 210. FIG. 4D illustrates a corner portion of protective case 20 including lens 210.

Dual lens 210 comprises a first portion 212 covering camera 12 and a second portion 214 covering flash 14. In some embodiments, dual lens 210 is at least partially received within a recess 26 of case 20 to secure dual lens 210 to case 20.

In some exemplary embodiments, the first portion 212 and first optically transparent region define a first plane and the second portion 214 and second optically transparent region define a second plane where the first and second planes are not co-planar. Illustratively, first portion 212 and second portion 214 are discontinuous and separated by an offset or step such that a distance $d_2$ is present between the top surfaces of each portion. In other embodiments, the top surfaces of the first portion 212 and the second portion 214 are co-planar and no step is present between the top surfaces of each portion.

As illustrated in FIGS. 4B-4D, first portion 212 and second portion 214 are each substantially circular. FIGS. 4B and 4C each illustrate first portion 212. In some embodiments second portion 214 the same shape as first portion 212 shown in FIG. 4D. First portion 212 and second portion 214 are illustratively attached to case 20 by a suitable adhesive 40. In some exemplary embodiments, adhesive 40 is optically opaque to prevent light from bleeding from flash 14 directly to camera 12 without passing through lens 210.

Dual lens 210 includes ink 42 extending around an outer portion of first portion 212 and second portion 214. A gasket 44 is illustratively provided between the case 20 and the lower surfaces of first portion 212 and second portion 214 to prevent light from bleeding from flash 14 directly to camera 12 without passing through lens 210. In some embodiments, gasket 44 may include an adhesive to secure each portion 212, 214 of lens 210 to case 20.

As illustrated in FIG. 4A, the dual lens 210 allows the first portion 212 to be positioned relatively close to the end of the housing 30 of camera 12 and the second portion 214 to be positioned relatively close to the flash 14. In some embodiments, the close positioning allows for higher transmissivity and reduced reflections through lens 210.

As shown in the exemplary embodiment of FIG. 4A, the use of the dual lens 210 allows for no intrusion of the case 20 into the field of view 32 for camera 12. The intrusion into the field of view 34 for the flash 14 is limited to a small amount of the first portion 212. This allows for a relatively high level of the light from flash 14 to be transmitted through lens 210 and received by camera 12.

Figure 5A:
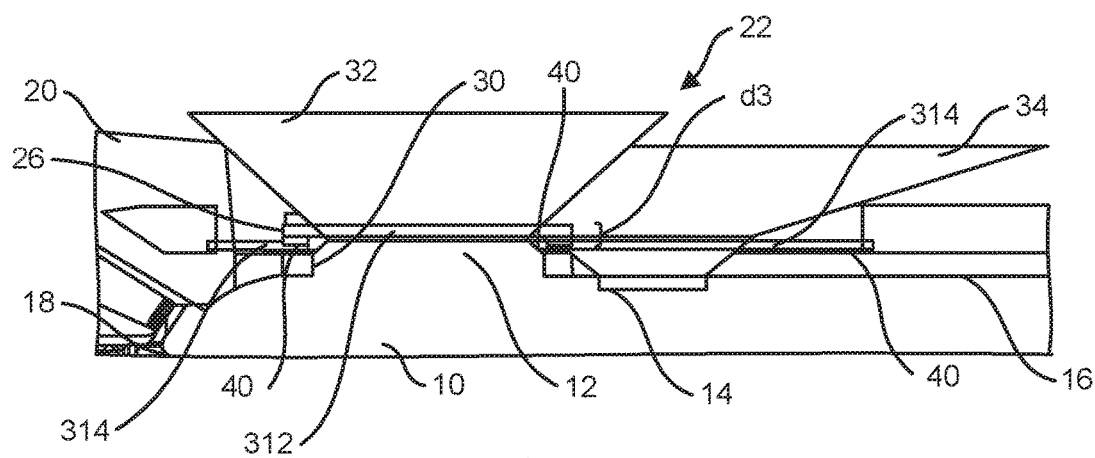
FIG. 5A illustrates a cross-section of a portion of a third embodiment of an exemplary protective case and lens proximate the camera and flash of the electronic device.
Figure 5B:
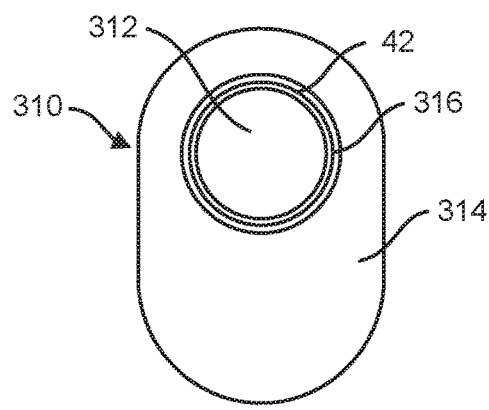
FIG. 5B illustrates the protective lens of FIG. 5A.
Figure 5C:
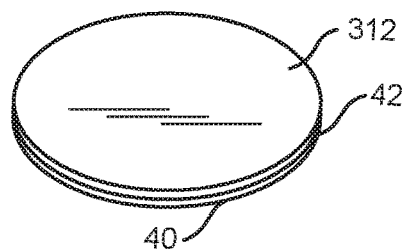
FIG. 5C illustrates the camera lens portion of the protective lens for FIG. 5B.
Figure 5D:
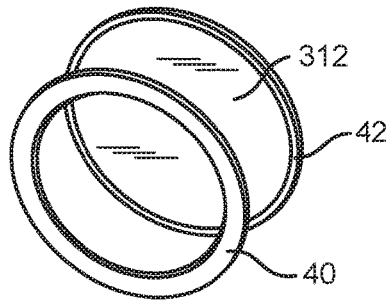
FIG. 5D illustrates an exploded view of the camera lens portion of FIG. 5C.
Figure 5F:
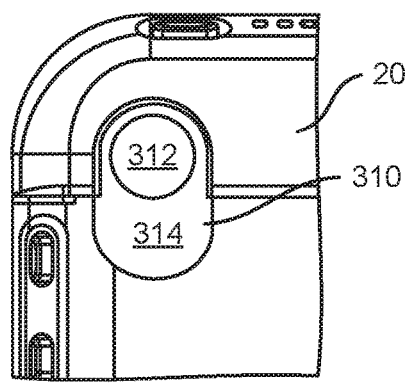
FIG. 5F illustrates another view of the protective case and lens of FIG. 5A.
Figure 5E:
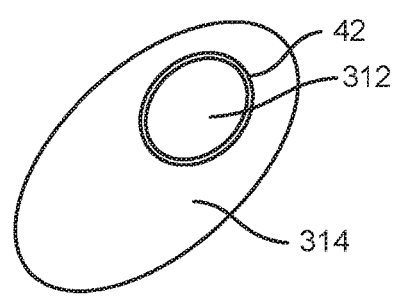
FIG. 5E illustrates a reverse view of the protective lens of FIG. 5B.

Referring next to FIGS. 5A-5E, a third embodiment of lens 24 is illustrated as stacked lens 310. Stacked lens 310 includes several similar elements as stepped lens 110 of FIGS. 3A-3C, and similar part numbers are used to describe similar elements. FIG. 5A illustrates a cross-section of a portion an exemplary protective case 20 including lens 310 covering the camera 12 and flash 14 of installed electronic device 10. As illustrated in FIG. 5A, the housing 30 of camera 12 extends above the back surface 16 of electronic device 10. FIG. 5B illustrates a back view of lens 310. FIG. 5C illustrates a perspective view of a first portion 312 of lens 310. FIG. 4C illustrates an exploded view of first portion 312 of the lens 310. FIG. 5D illustrates a top perspective view of the lens 310. FIG. 5E illustrates a corner portion of protective case 20 including lens 310.

Stacked lens 310 comprises a first portion 312 covering camera 12 and a second portion 314 covering flash 14. In some embodiments, stacked lens 310 is at least partially received within a recess 26 of case 20 to secure stacked lens 310 to case 20.

In some exemplary embodiments, the first portion 312 defines a first plane and the second portion 314 defines a second plane where the first and second planes are not co-planar. Illustratively, first portion 312 is attached to a top surface of second portion 314 such that the respective top surfaces of first portion 312 and second portion 314 and separated by an offset or step such that a distance $d_3$ is present between the top surfaces of each portion.

As illustrated in FIGS. 5B-5F, first portion 312 is substantially circular. Second portion 314 includes rounded ends and has a substantially circular aperture 316 approximately the same size as first portion 312 to allow the optically transparent region of the first portion 312 to be positioned above the aperture 316 in the second portion 314. First portion 312 includes an adhesive to securely adhere first portion 312 to second portion 314 above the aperture 316. First portion 312 includes ink 42 extending around an outer portion of first portion 312. In some embodiments, a gasket 44 is illustratively provided between the case 20 and the lower surfaces of first portion 312 and second portion 314 to prevent light from bleeding from flash 14 directly to camera 12 without passing through lens 310. In some embodiments, gasket 44 may include an adhesive to secure lens 310 to case 20.

As illustrated in FIG. 5A, the stacked lens 310 allows the first portion 312 to be positioned relatively close to the end of the housing 30 of camera 12 and the second portion 314 to be positioned relatively close to the flash 14. In some embodiments, the close positioning allows for higher transmissivity and reduced reflections through lens 310.

As shown in the exemplary embodiment of FIG. 5A, the use of the lens 310 allows for no intrusion of the case 20 into the field of view 32 for camera 12. The intrusion into the field of view 34 for the flash 14 is limited to a small amount of the first portion 312. This allows for a relatively high level of the light from flash 14 to be transmitted through lens 310 and received by camera 12.

Figure 6A:
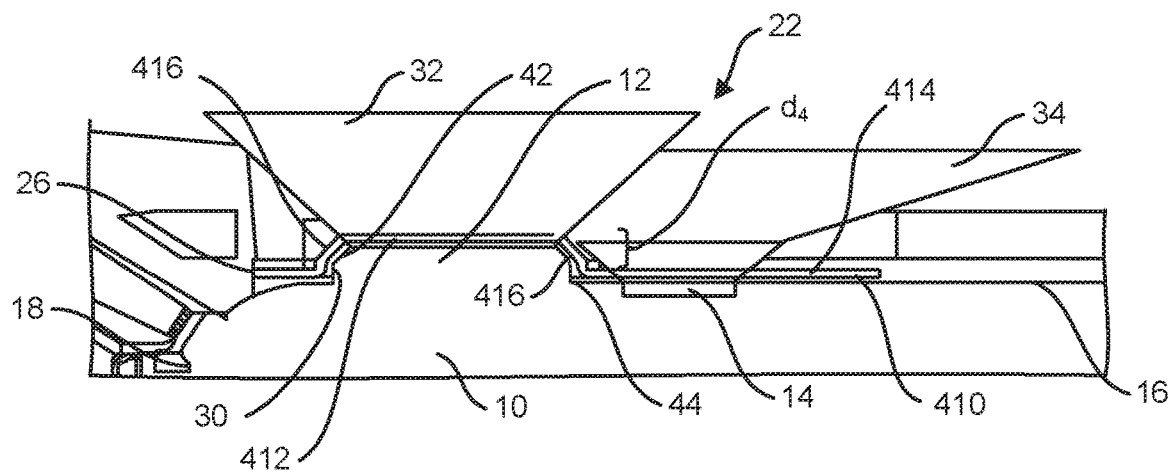
FIG. 6A illustrates a cross-section of a portion of a fourth embodiment of an exemplary protective case and lens proximate the camera and flash of the electronic device.
Figure 6B:
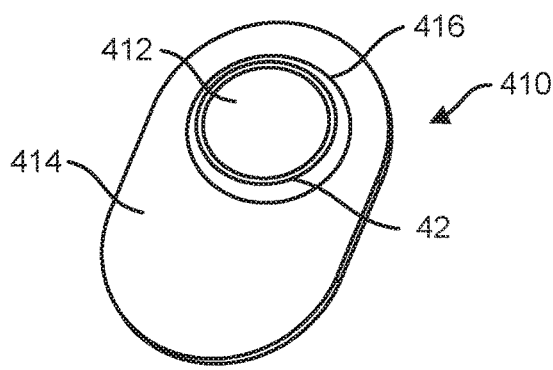
FIG. 6B illustrates the protective lens of FIG. 6A.
Figure 6C:
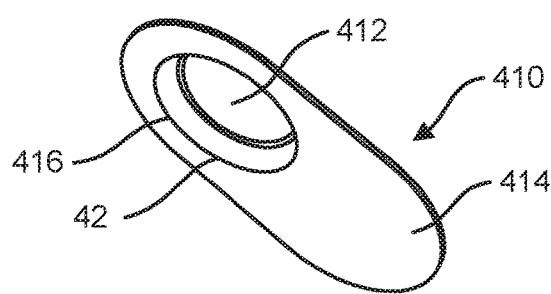
FIG. 6C illustrates another view of the protective lens of FIG. 6B.
Figure 6D:
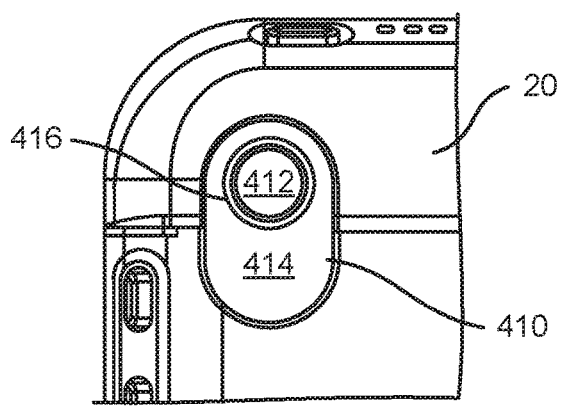
FIG. 6D illustrates another view of the protective case and lens of FIG. 4A.

Referring next to FIGS. 6A-6E, a fourth embodiment of lens 24 is illustrated as formed lens 410. Formed lens 410 includes several similar elements as stepped lens 110 of FIGS. 3A-3C, and similar part numbers are used to describe similar elements. FIG. 6A illustrates a cross-section of a portion an exemplary protective case 20 including lens 410 covering the camera 12 and flash 14 of installed electronic device 10. As illustrated in FIG. 6A, the housing 30 of camera 12 extends above the back surface 16 of electronic device 10. FIG. 6B illustrates a front perspective view of lens 410. FIG. 6C illustrates a back perspective view of lens 410. FIG. 4D illustrates a corner portion of protective case 20 including lens 410.

Formed lens 410 comprises a first portion 412 covering camera 12 and a second portion 414 covering flash 14. In some embodiments, formed lens 410 is at least partially received within a recess 26 of case 20 to secure lens 410 to case 20.

In some exemplary embodiments, the first portion 412 defines a first plane and the second portion 414 defines a second plane where the first and second planes are not co-planar. Illustratively, first portion 412 is attached to a top surface of second portion 414 such that the respective top surfaces of first portion 412 and second portion 414 and separated by an offset or step such that a distance $d_4$ is present between the top surfaces of each portion.

As illustrated in FIGS. 6B-6C, formed lens 410 is formed from a single piece of material, such as a glass or plastic. First portion 412 is a substantially circular raised section in the middle of lens 414. Second portion 414 includes rounded ends and extends around the exterior of first portion 412. A connecting region 416 extends between the first portion 412 and second portion 414. Lens 410 is illustratively formed by forming a warmed piece of flat material around a mold to form the protruding flat first portion 412. Connecting portion 416 includes ink 42 to optically isolate the first portion 412 from the second portion 414. In some embodiments, a gasket 44 is illustratively provided between the case 20 and the lower surfaces of first portion 312 and second portion 314 to prevent light from bleeding from flash 14 directly to camera 12 without passing through lens 410. In some embodiments, gasket 44 may include an adhesive to secure lens 410 to case 20.

As illustrated in FIG. 6A, the stacked lens 410 allows the first portion 412 to be positioned relatively close to the end of the housing 30 of camera 12 and the second portion 414 to be positioned relatively close to the flash 14. In some embodiments, the close positioning allows for higher transmissivity and reduced reflections through lens 410.

As shown in the exemplary embodiment of FIG. 6A, the use of the lens 410 allows for no intrusion of the case 20 into the field of view 32 for camera 12 or for the field of view 34 for the flash 14. This allows for a relatively high level of the light from flash 14 to be transmitted through lens 410 and received by camera 12.

Figure 7A:
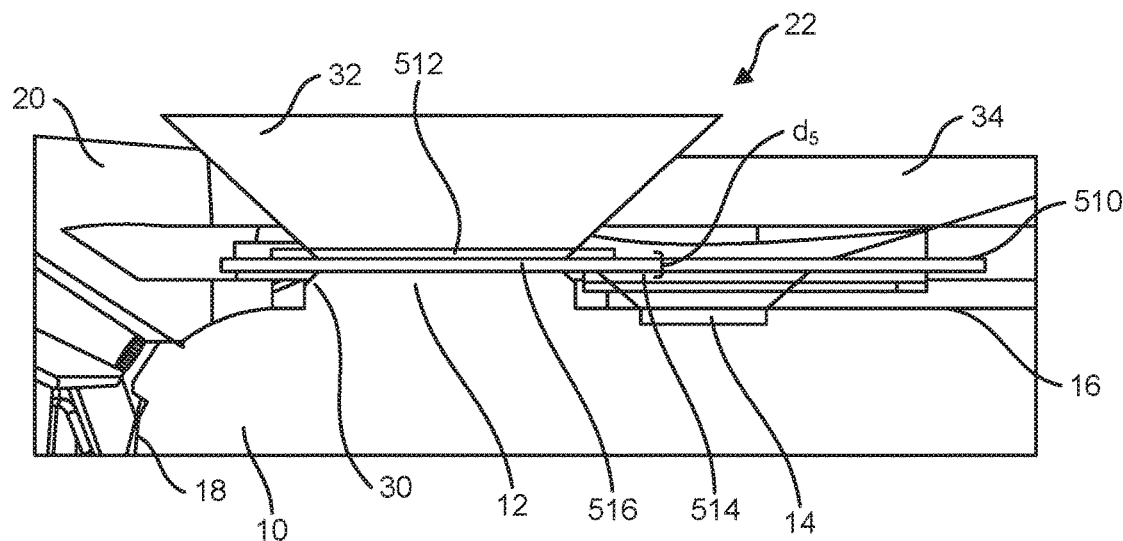
FIG. 7A illustrates a cross-section of a portion of a fifth embodiment of an exemplary protective case and lens proximate the camera and flash of the electronic device.
Figure 7B:
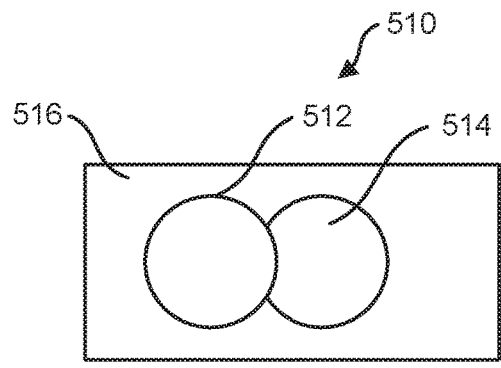
FIG. 7B illustrates a first more particular embodiment of the lens of FIG. 7A.
Figure 7C:
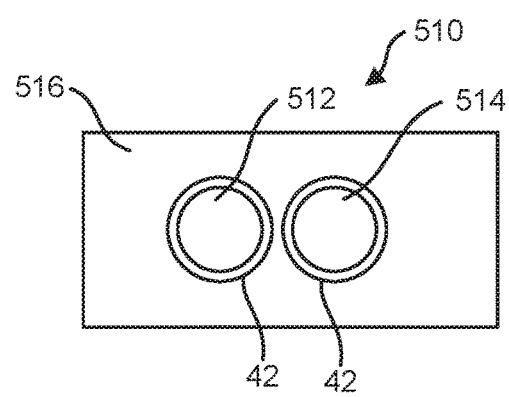
FIG. 7C illustrates a second more particular embodiment of the lens of FIG. 7A.

Referring next to FIGS. 7A-7C, a fourth embodiment of lens 24 is illustrated as carried lens 510. Carried lens 510 includes several similar elements as stepped lens 110 of FIGS. 3A-3C, and similar part numbers are used to describe similar elements. FIG. 7A illustrates a cross-section of a portion an exemplary protective case 20 including lens 510 covering the camera 12 and flash 14 of installed electronic device 10. As illustrated in FIG. 7A, the housing 30 of camera 12 extends above the back surface 16 of electronic device 10.

Carried lens 510 comprises a first portion 512 covering camera 12 and a second portion 514 covering flash 14. First portion 512 and second portion 514 are attached a carrier 516, such as a plastic or think film to hold the first portion 512 and second portion 514 in position relative to the camera 12 and flash 14. In some embodiments, carrier 516 is optically clear. In other embodiments, carrier 516 is at least partially opaque. In some embodiments, carrier 516 is at least partially received within a recess 26 of case 20 to secure lens 510 to case 20.

In some embodiments, first portion 512 and/or second portion 514 includes ink 42 to optically isolate the first portion 512 from the second portion 514. In some embodiments, a gasket 44 is illustratively provided between the case 20 and lens 510 to prevent light from bleeding from flash 14 directly to camera 12 without passing through lens 510. In some embodiments, gasket 44 may include an adhesive to secure lens 510 to case 20.

In some exemplary embodiments, the first portion 512 is attached to a first side of carrier 516 and the second portion 514 is attached to a second side of carrier 516 opposite the first side. As such, the first portion 512 defines a first plane and the second portion 514 defines a second plane where the first and second planes are not co-planar. Illustratively, first portion 512 is attached to a top surface of second portion 514 such that the respective top surfaces of first portion 512 and second portion 514 and separated by an offset or step such that a distance $d_s$ is present between the top surfaces of each portion.

As illustrated in FIG. 7B, in some embodiments the first portion 512 and the second portion 514 overlap or share an edge when viewed from the back. In some embodiments, the second portion 514 is a complete circle that extends at least partially below the circle of the first portion 512. In other embodiments, the second portion 514 includes a missing portion of the circle, such that the second portion 514 does not overlap with the first portion 512 when viewed from the back, but instead appears to share a common edge. As illustrated in FIG. 7C, in still other embodiments, the first portion 512 is spaced apart from the second portion 514.

In FIGS. 7B and 7C, first portion 512 and second portion 514 are illustrated as substantially circular. In other embodiments, one or both of first portion 512 and second portion 514 is non-circular, such as oval or D-shaped.

As illustrated in FIG. 7A, positioning first portion 512 and second portion 514 on opposite sides of carrier 516 allows the first portion 512 to be positioned relatively close to the end of the housing 30 of camera 12 and the second portion 514 to be positioned relatively close to the flash 14. In some embodiments, the close positioning allows for higher transmissivity and reduced reflections through lens 510.

As shown in the exemplary embodiment of FIG. 7A, the use of the lens 510 allows for no intrusion of the case 20 into the field of view 32 for camera 12. The intrusion into the field of view 34 for the flash 14 is limited to a small amount of the first portion 512. This allows for a relatively high level of the light from flash 14 to be transmitted through lens 510 and received by camera 12.

Figure 8A:
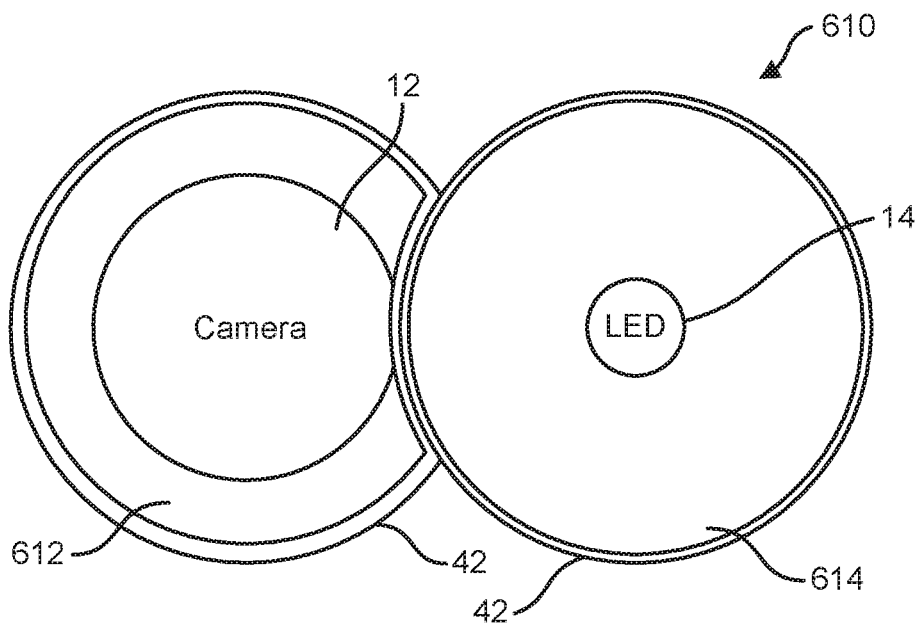
FIG. 8A illustrates a sixth embodiment of a protective lens.
Figure 8B:
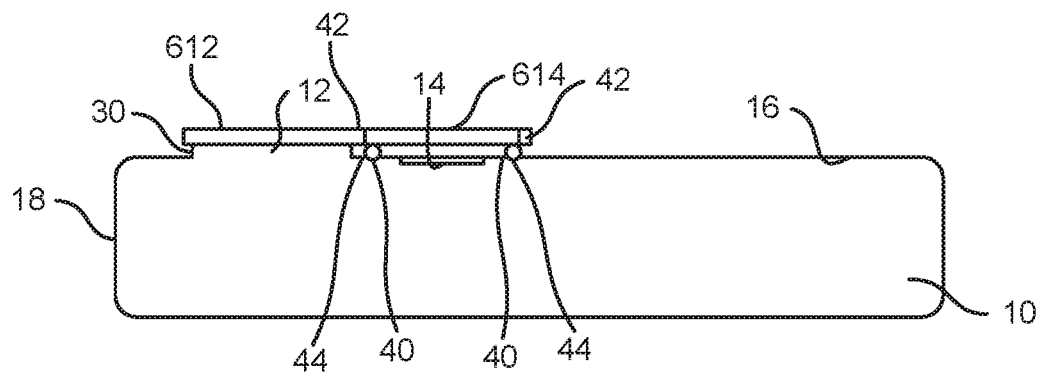
FIG. 8B illustrates a cross-section of the lens of FIG. 8A proximate a camera and flash of an electronic device.
Figure 8C:
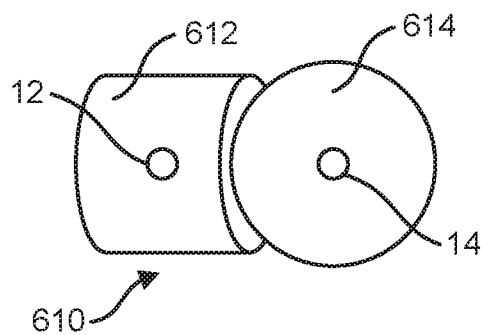
FIG. 8C illustrates a first more particular embodiment of the lens of FIG. 8A.

Referring next to FIGS. 8A-8C, a fifth embodiment of lens 24 is illustrated as lens 610. Lens 610 includes several similar elements as stepped lens 110 of FIGS. 3A-3C, and similar part numbers are used to describe similar elements. As shown in FIG. 8A, lens 610 includes a first portion 612 covering camera 12 and a second portion 614 covering flash 14. In some embodiments, first portion 612 and second portion 614 are attached a carrier, such as a plastic or think film, or may be formed from a single piece of material. In other embodiments, first portion 614 and second portion 616 are abutting distinct pieces of material. In some embodiments, lens 610 is at least partially secured in place relative to the electronic device 10 by a case 20. In other embodiments, an adhesive 40 directly adheres lens 610 to electronic device 10.

FIG. 8B illustrates a cross-section of a portion an exemplary protective case 20 including lens 510 covering the camera 12 and flash 14 of installed electronic device 10. As illustrated in FIG. 8A, the housing 30 of camera 12 extends above the back surface 16 of electronic device 10.

In some embodiments, first portion 612 and/or second portion 614 includes ink 42 to optically isolate the first portion 612 from the second portion 614. As shown in FIG. 8B, in some embodiments, a gasket 44 is illustratively provided between the case 20 and lens 610 to prevent light from bleeding from flash 14 directly to camera 12 without passing through lens 610. In some embodiments, gasket 44 may include an adhesive to secure lens 610 to case 20.

Figure 8D:
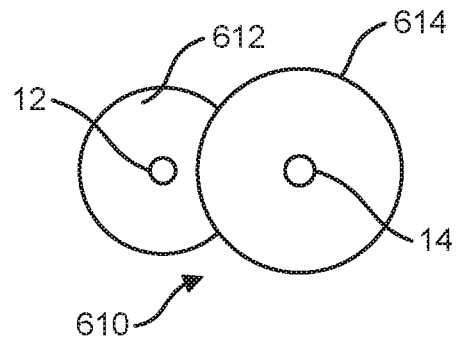
FIG. 8D illustrates a second more particular embodiment of the lens of FIG. 8A.

Any suitable shape for first portion 612 and second portion 614 may be used. For example, as illustrated in FIG. 8C, in some embodiments the second portion 614 has a substantially circular shape, and the first portion 612 has two substantially straight edges, a convexly curved edge, and a convexly curved edge adjacent the edge of the second portion 614. As illustrated in FIG. 8D, in other embodiments, each of the first portion 612 and the second portion 614 are substantially circular, but a portion of either portion is missing, such as the missing notch from first portion 612 illustrated in FIG. 8D. As shown in FIGS. 8C and 8D, in some embodiments, second portion 614 has a larger radius than first portion 612 to accommodate the expanded field of view of the flash 14 due to its position below the housing 30 of camera 12 (see FIG. 8B).

Figure 9A:
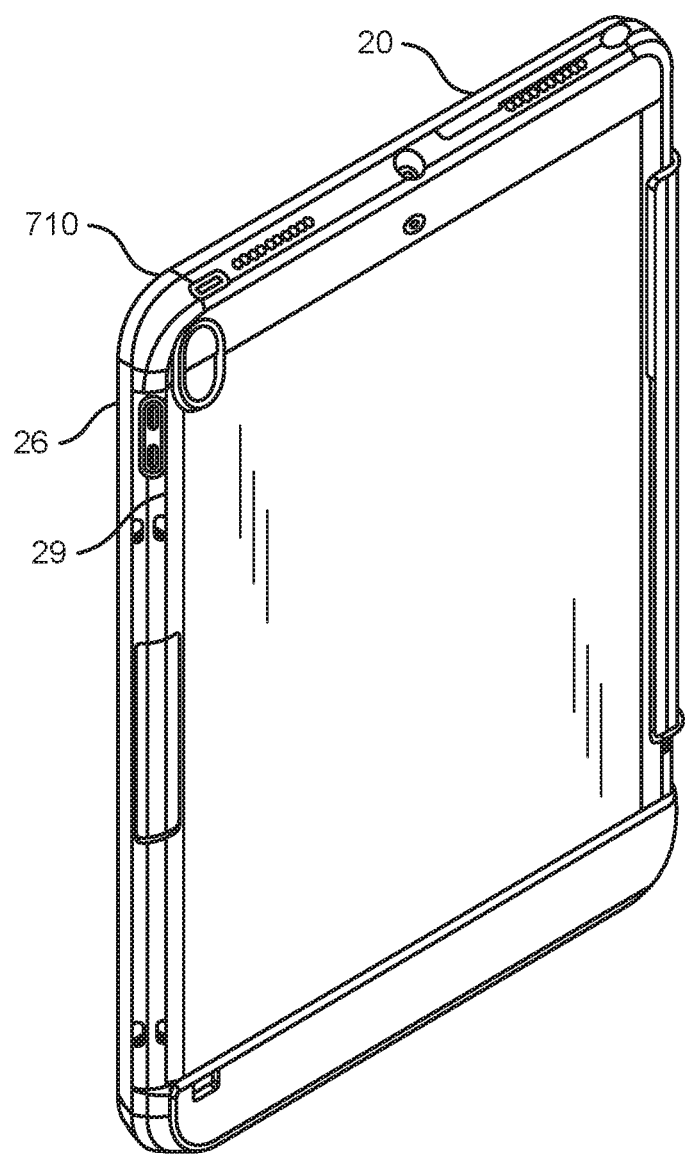
FIG. 9A illustrates a rear perspective view of an exemplary protective case including an exemplary protective lens insert.
Figure 9B:
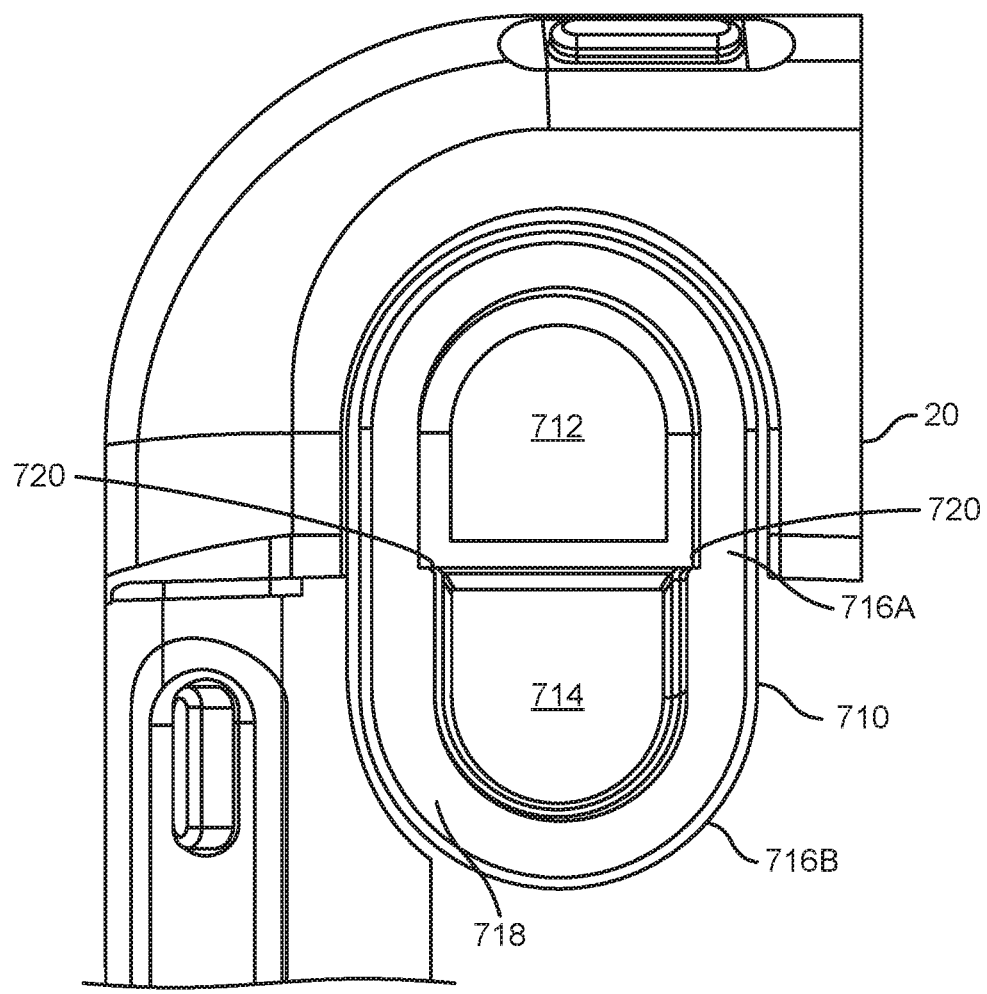
FIG. 9B illustrates a rear view of the protective case and protective lens insert of FIG. 9A.
Figure 9C:
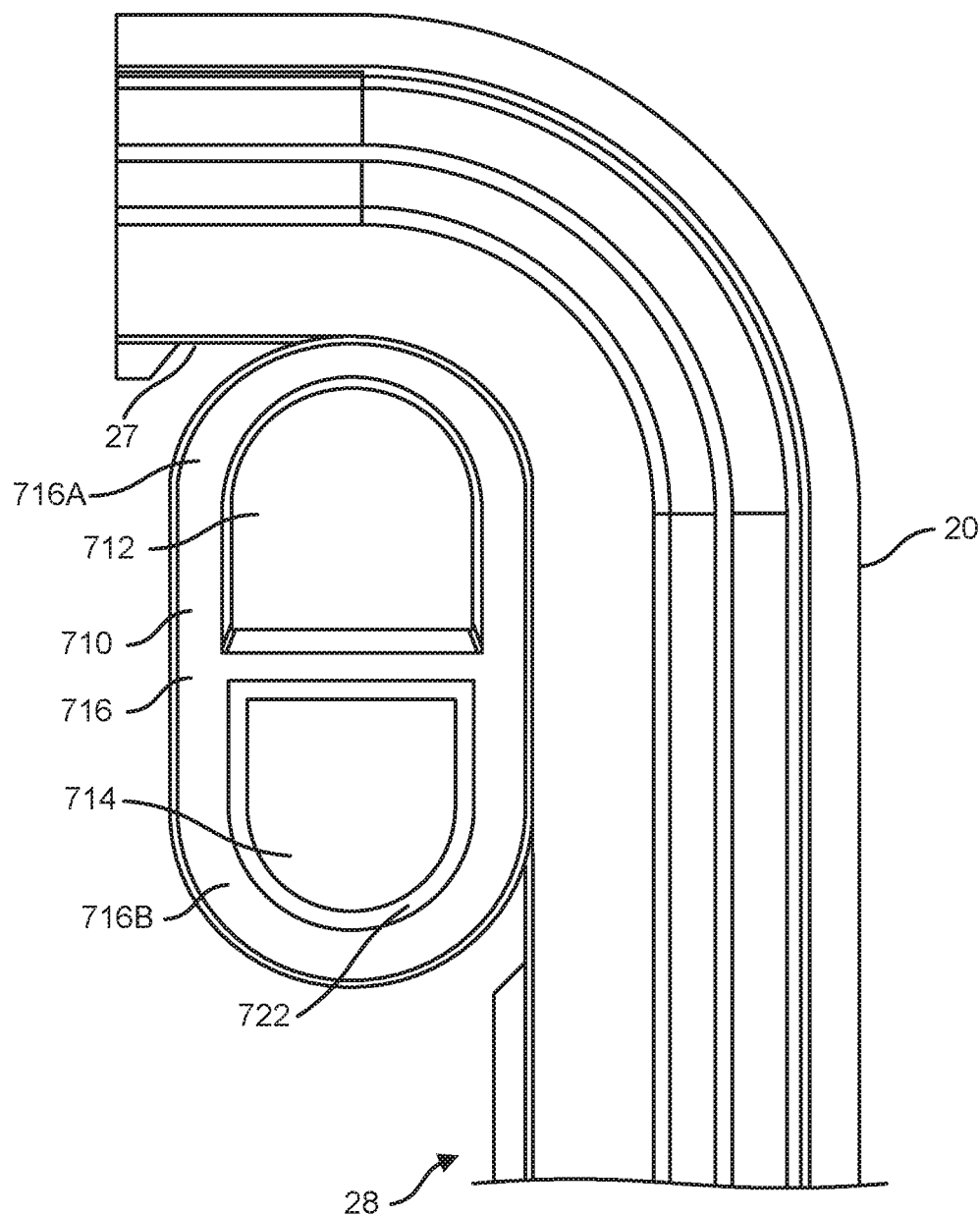
FIG. 9C illustrates a front view of the protective case and the protective lens insert of FIG. 9A.

Referring next to FIGS. 9A-9D, another exemplary protective case 20 is illustrated. In the exemplary embodiment shown in FIG. 9A, case 20 includes a seventh embodiment of lens 24 illustrated as lens insert 710. Lens insert 710 includes several similar elements as stepped lens 110 of FIGS. 3A-3C, and similar part numbers are used to describe similar elements. As shown in FIG. 9C, case 20 further includes an opening 27 on a front side of case 20 configured to allow electronic device 10 (not illustrated in FIG. 9C) to be received within an interior 28 of case 20 such that camera 12 and flash 14 are aligned with lens insert 710. Case 20 further includes a rear surface 29 configured to at least partially cover and protect electronic device 10 when electronic device 10 is installed within protective case 20.

Lens insert 710 comprises a first lens portion 712 covering camera 12 and a second lens portion 714 covering flash 14 of electronic device 10 when electronic device 10 is installed within protective case 20. In some exemplary embodiments, first lens portion 712 and second lens portion 714 are formed from separate pieces of transparent material. Lens insert 710 is at least partially received within a recess 26 of case 20.

Figure 9D:
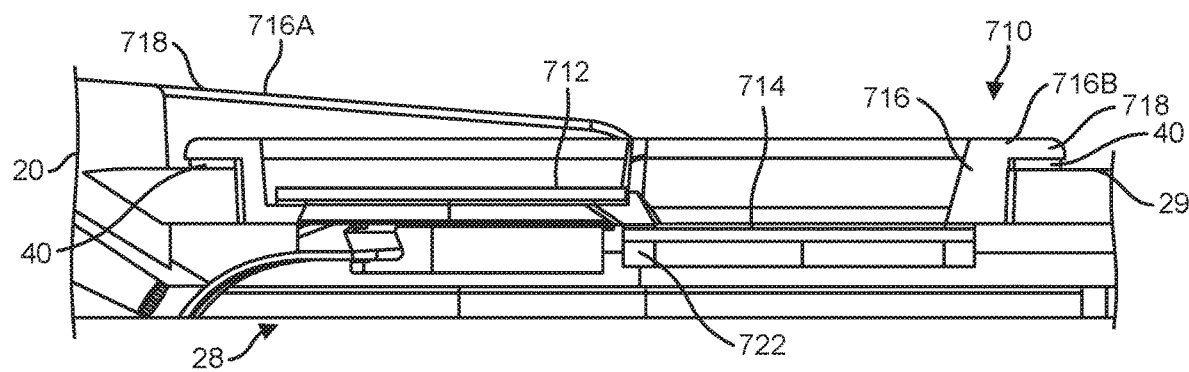
FIG. 9D illustrates a section view of the protective case and protective lens insert of FIG. 9A.

As shown in FIG. 9D, the first lens portion 712 defines a first plane and the second lens portion 714 defines a second plane where the first and second planes are not co-planar. As illustrated in FIG. 9D, the plane of the first lens portion 712 is positioned closer to a rear surface 29 of the protective case 20 and the plane of second lens portion 714 is positioned closer to the interior 28 of case. As illustrated in FIGS. 9B and 9C, in some embodiments first lens portion 712 and second lens portion 714 are each substantially D-shaped.

First lens portion 712 and second lens portion 714 are illustratively positioned within a housing 716. Housing 716 is illustratively positioned within aperture 26 and secured to case 20 with a suitable adhesive 40. Referring to the exemplary embodiment illustrated in FIG. 9B, housing 716 includes a perimeter lip 718 extending around an outer perimeter of housing 716. As shown in FIG. 9D, a suitable adhesive 40 adheres the perimeter lip 718 to the rear surface 29 of protective case 20, thereby affixing lens insert 710 to the remainder of protective case 20. In some exemplary embodiments, adhesive 40 extends around perimeter lip 718 of housing 716 to provide a waterproof and/or dustproof seal between the interior 28 of protective case 20 and an exterior environment.

Referring again to FIG. 9B, in some exemplary embodiments housing 716 includes one or more notches 720 around an internal surface of perimeter lip 718. Notches 720 provide distinct aperture widths for an upper portion 716A of housing 716 proximate first lens portion 712 and a lower portion 716B of housing 716 proximate second lens portion 714. First lens portion 712 and second lens portion 714 each have a width corresponding to the width of the aperture of either the upper portion 716A or lower portion 716B of housing, providing ease in placement and orientation of the first lens portion 712 and second lens portion 714 into the appropriate portion of housing 716 during manufacture and assembly of lens insert 710.

As shown in FIGS. 9C and 9D, the bottom of lens insert 710 further includes one or more gaskets 722 extending towards an installed electronic device 10 (not shown in FIGS. 9C and 9D). In some exemplary embodiments, gasket 722 is configured to contact and/or compress against a back side of the installed electronic device. Each gasket 722 may be positioned to at least partially surround camera 12 and/or flash 14 of the installed electronic device 10. As illustrated in FIGS. 9C and 9D, gasket 722 is configured to surround the flash 14 of the installed electronic device.

Gasket 722 is illustratively formed from a compressible and light-blocking material, such as a closed cell foam. In some embodiments, gasket 722 prevents all or substantially all light from flash 14 of installed electronic device 10 from being transmitted through gasket 722, while the compressibility of gasket 722 allows it to contour to the surface of the installed electronic. In this way, gasket 722 advantageously prevents light from flash 14 of installed electronic device 10 from being transmitted to camera 12 through a path other than through second lens portion 714 and first lens portion 712.

Lens 710 includes ink 42 extending around at least a portion of first lens portion 712 and/or second lens portion 714. Ink 42 is a light-blocking material configured to prevent light from entering the portion of first lens portion 712 or second lens portion 714 covered with ink 42.

Figure 9E:
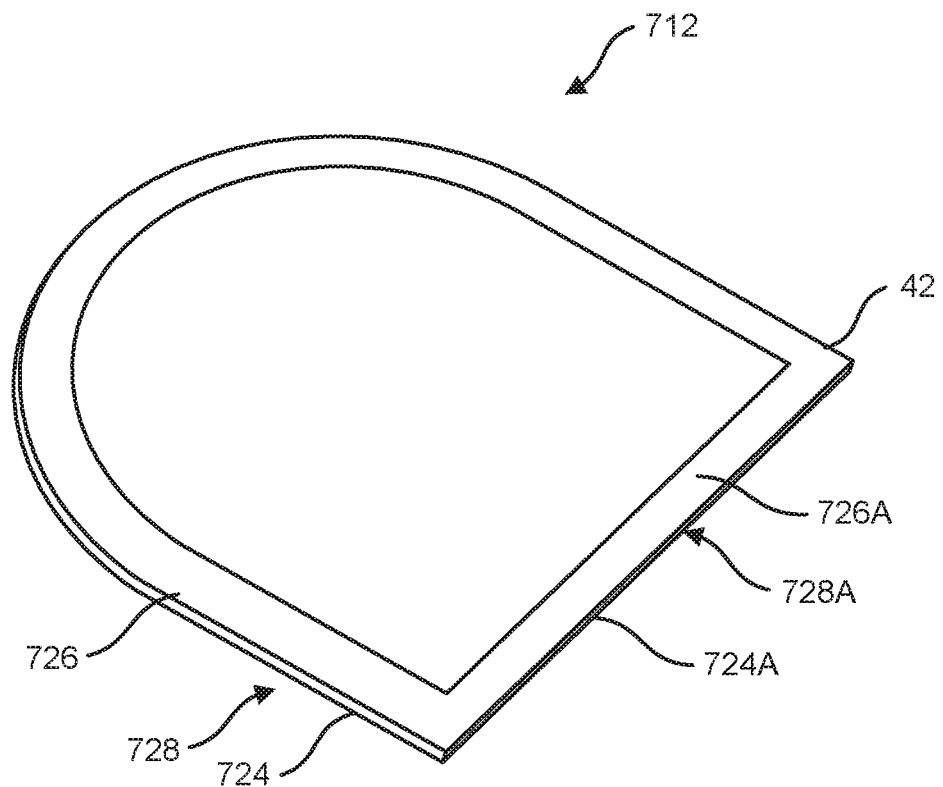
FIG. 9E illustrates an exemplary first lens portion of the protective lens insert of FIG. 9A.

Referring next to FIG. 9E, an exemplary first lens portion 712 is illustrated. At least a portion of side surface 724 is coated with ink 42. As illustrated in FIG. 9E, ink 42 fully covers side surface 724A, positioned closest to second lens portion 714 (see FIG. 9D) and flash 14 when electronic device 10 is installed in protective case 20. In this way, ink 42 on side surface 724A prevents light from flash 14 from entering first lens portion 712 from side surface 724A.

As further shown in FIG. 9E, at least a portion of the perimeter of top surface 726 may be coated with ink 42. As illustrated in FIG. 9E, the full perimeter of top surface 726 is coated with ink 42. In some exemplary embodiments, ink covers at least the perimeter portion 726A of the top surface 726 positioned closest to second lens portion 714 (see FIG. 9D) and flash 14 when electronic device 10 is installed in protective case 20. In this way, ink 42 on perimeter portion 726A prevents light from flash 14 from entering first lens portion 712 from perimeter portion 726A.

At least a portion of the perimeter of bottom surface 728 opposite top surface 726 may be coated with ink 42. In some exemplary embodiments, the full perimeter of bottom surface 728 is coated with ink 42. In some exemplary embodiments, ink covers at least the perimeter portion 728A of the bottom surface 728 positioned closest to second lens portion 714 (see FIG. 9D) and flash 14 when electronic device 10 is installed in protective case 20. In this way, ink 42 on perimeter portion 728A prevents light from flash 14 from entering first lens portion 712 from perimeter portion 728A.

In some exemplary embodiments, ink 42 covers at least a portion of side surface 724, and top perimeter portion 726, such as side surface 724A and top perimeter portion 726A. In some exemplary embodiments, ink 42 covers at least a portion of side surface 724, and bottom perimeter portion 728, such as side surface 724A and bottom perimeter portion 728A. In some exemplary embodiments, ink 42 covers at least a portion of side surface 724, top perimeter portion 726, and bottom perimeter portion 728, such as side surface 724A, top perimeter portion 726A, and bottom perimeter portion 728A. In some exemplary embodiments, ink 42 fully covers side surface 724, top perimeter portion 726 and bottom perimeter portion 728. Without wishing to be held to any particular theory, it is believed that covering at least side surface 724A and bottom perimeter portion 728A with light-blocking ink prevents all or nearly all light from flash 14 of installed electronic device 10 from bleeding through first lens portion 712 upon taking a picture with camera 12, thereby improving the quality of the photographic image taken by camera 12.

Second lens portion 714 may have ink 42 positioned on the same or different edge surfaces as first lens portion 714.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A protective lens cover for a camera and a flash of an electronic device, the protective lens cover comprising:
   a first lens portion for covering the camera of the electronic device, the first lens portion having a top surface, a bottom surface positioned directly opposite the top surface, and a side surface extending from the top surface to the bottom surface, wherein at least a portion of the side surface is coated with a light-blocking ink; and
   a second lens portion for covering the flash of the electronic device, the second lens portion having a top surface, the top surface of the first lens portion being offset from the top surface of the second lens portion by a first step distance.

2. The protective lens cover of claim 1, wherein the light-blocking ink fully covers the side surface of the first lens portion.

3. The protective lens cover of claim 1, wherein a perimeter portion of the top surface of the first lens portion is coated with the light-blocking ink.

4. The protective lens cover of claim 1, wherein a perimeter portion of the bottom surface of the first lens portion is coated with the light-blocking ink.

5. The protective lens cover of claim 1, further comprising an optically opaque adhesive attaching the first lens portion to the second lens portion.

6. The protective lens cover of claim 1, wherein the ink-coated portion of the side surface is positioned directly above the second lens portion.

7. The protective lens cover of claim 1, wherein the first lens portion and the second lens portion are each substantially D-shaped.

8. The protective lens cover of claim 1, wherein the second lens portion has a bottom surface positioned directly opposite the top surface of the second lens portion, and a side surface extending from the top surface of the second lens portion to the bottom surface of the second lens portion, at least a portion of the side surface of the second lens portion being coated with a light-blocking ink.

9. A lens insert for covering a camera and a flash of an electronic device, the lens insert including:
   a first lens having a first top surface, a first bottom surface positioned directly opposite the first top surface, and a first side surface extending from the first top surface to the first bottom surface and at least partially coated with a light-blocking ink, wherein the first bottom surface is configured to be positioned facing the camera and the first top surface is configured to be positioned facing away from the camera when the lens insert covers the electronic device;
   a second lens having a second top surface, a second bottom surface positioned directly opposite the second top surface, and a second side surface extending from the second top surface to the second bottom surface; and
   a housing receiving the first lens and the second lens.

10. The lens insert of claim 9, wherein the first top surface of the first lens is offset from the second top surface of the second lens by a first step distance.

11. The lens insert of claim 9, wherein the light-blocking ink fully covers the first side surface.

12. The lens insert of claim 9, wherein the housing includes a perimeter lip extending around an outer perimeter of the housing.

13. The lens insert of claim 9, wherein the housing includes an upper portion for receiving the first lens and a lower portion for receiving the second lens.

14. The lens insert of claim 13, wherein the first lens has a first width corresponding to a width of the upper portion of the housing and the second lens has a second width corresponding to a width of the lower portion of the housing, the first width being different than the second width.

15. The lens insert of claim 9, wherein the housing includes a gasket configured to at least partially surround the camera or the flash when the lens insert covers the electronic device.

16. A protective case for an electronic device having a camera and a flash, the protective case including:
   a surface configured to at least partially cover the electronic device when the electronic device is installed within an interior of the protective case; and
   a lens insert received within a recess in the surface, the lens insert comprising:
      a housing;
      a first lens received within the housing and configured to cover the camera of the installed electronic device, the first lens having a first bottom surface facing the interior of the protective case, a first top surface positioned directly opposite the first bottom surface, and a first perimeter surface extending from the first top surface to the first bottom surface and at least partially coated with a light-blocking ink; and
      a second lens received within the housing and configured to cover the flash of the installed electronic device.

17. The protective case of claim 16, wherein the light-blocking ink is configured to prevent light from the flash of the installed electronic device from entering the first lens through the perimeter surface.

18. The protective case of claim 16, wherein a portion of the first bottom surface positioned closest to the second lens is coated with the light-blocking ink.

19. The protective case of claim 16, wherein the first top surface of the first lens is offset from the second top surface of the second lens by a first step distance.

20. The protective case of claim 16, wherein the surface is configured to cover at least a portion of a back surface of the installed electronic device.

* * * * *